United States Patent [19]

Antes et al.

[11] Patent Number: 5,104,471
[45] Date of Patent: Apr. 14, 1992

[54] INTERLAMINAR SANDWICH WITH DIFFRACTION STRUCTURE

[75] Inventors: Gregor Antes, Hirzel; Ohannes Minnetian, Luzern, both of Switzerland

[73] Assignee: Landis & Gyr Betriebs AG, Zug, Switzerland

[21] Appl. No.: 618,707

[22] Filed: Nov. 27, 1990

[51] Int. Cl.⁵ .................... B32B 9/00; B44C 1/165
[52] U.S. Cl. .................... 156/233; 428/198; 428/209; 428/336; 428/423.1; 428/480; 428/447; 428/915; 428/916; 283/85; 283/86; 283/87; 283/91; 283/904
[58] Field of Search ............. 428/195, 198, 209, 76, 428/915, 916, 343, 346, 447, 457, 480, 423.1, 336; 156/233; 283/85, 86, 87, 91, 904

[56] References Cited

U.S. PATENT DOCUMENTS

| | | |
|---|---|---|
| 4,057,919 | 11/1977 | Gauch et al. |
| 4,184,700 | 1/1980 | Greenaway. |
| 4,250,217 | 2/1981 | Greenaway. |
| 4,304,809 | 12/1981 | Moraw et al. |
| 4,556,378 | 12/1985 | Nyfeler et al. |
| 4,629,647 | 12/1986 | Sander. |
| 4,717,615 | 1/1988 | Reinhart ............... 428/916 |
| 4,728,377 | 3/1988 | Gallagher ............. 283/904 |

Primary Examiner—Patrick J. Ryan
Assistant Examiner—Elizabeth Evans
Attorney, Agent, or Firm—Marmorek, Guttman & Rubenstein

[57] ABSTRACT

An interlaminar sandwich comprises first and second lacquer layers, a diffraction structure embedded between the first and second lacquer layers, a heat activated adhesive layer disposed one one of the lacquer layers, and a transparent stabilization layer disposed over the other lacquer layer, the stabilization layer distributing heat evenly through the interlaminar sandwich so that when heat is applied to the stabilization layer, the adhesive layer will bond the interlaminar sandwich to a substrate. Preferably, the interlaminar sandwich also contains an intermediary layer between the stabilization layer and the first lacquer layer which bonds these layers together. At temperatures below 170° C., the adhesive layer is bonded so intimately to the substrate that the interlaminar sandwich cannot be removed from the substrate without tearing it. At temperatures above 150° C., the lacquer layers soften, thus destroying the diffraction structure. After being built up on a film, the interlaminar sandwich can be punched out in the form of a tag and attached to an identification document thereby protecting the document against attempts to remove the tag.

23 Claims, 1 Drawing Sheet

INTERLAMINAR SANDWICH WITH DIFFRACTION STRUCTURE

BACKGROUND OF THE INVENTION

The instant invention relates to an interlaminar sandwich of the type wherein a diffraction structure is embedded between two lacquer layers, and wherein a heat activated layer bonds the interlaminar sandwich to a substrate. The invention also relates to a method of utilizing the interlaminar sandwich to protect an identification document.

Such an interlaminar sandwich is advantageously used to increase forgery protection of documents of all kinds, whereby the interlaminar sandwich with its eye-catching optically variable patterns is pasted on the document.

A multilayer structure of hot-embossed films of various designs with holograms is known from EP 170 832 A1 (U.S. Pat. No. 4,629,646) for example. Such structures are characterized by an interlaminar sandwich comprising a separation layer, a lacquer layer containing the hologram, and an adhesive layer. The separation layer connects the interlaminar sandwich to a support film until it is pasted on a substrate. The adhesive layer is heated through the support film, the separation layer and the lacquer layer, and a high degree of adhesion to the substrate is achieved. Following the gluing operation, the separation layer makes it possible for the support film to be easily detached from the interlaminar sandwich which is now firmly bonded to the substrate.

A five-layer film with two lacquer layers whose optical properties are clearly distinct from each other and which constitute a decorative layer is known from DE-OS 35 27 412 (U.S. Pat. No. 4,17,615).

On identification cards the individual layers are often glued in a grid so that one or several thin intermediary layers tear at predetermined points in case of an unwanted separation of the protective layers. EP-253 089 A1 described this method for the protection of optical markings, while the protection of an identification document made of paper and laminated between two films can be increased according to claim U.S. Pat. No. 4,057,919.

Different embossing processes for low-cost duplication of optical diffraction structures in thermoplastic surfaces are described, for example, in CH-PS (Swiss patent) 661 683 (U.S. Pat. No. 4,556,378), CH-PS 595 664 (U.S. Pat. No. 4,250,217) and CH-PS 594 936 (U.S. Pat. No. 4,184,700).

It is the object of the instant invention to create an interlaminar sandwich having optical diffraction structures embedded therein, which interlaminar sandwich is pasted on a substrate under the effect of heat and whose diffraction structures are certain to be destroyed when an attempt is made to detach the interlaminar sandwich from the document.

SUMMARY OF THE INVENTION

The above-mentioned object is achieved by an interlaminar sandwich comprising first and second lacquer layers, a diffraction structure embedded between the first and second lacquer layers, a heat activated adhesive layer disposed on one of the lacquer layers, and a transparent stabilization layer disposed over the other lacquer layer, the stabilization layer distributing heat evenly through the interlaminar sandwich so that when heat is applied to the stabilization layer, the adhesive layer will bond the interlaminar sandwich to a substrate. Preferably, the interlaminar sandwich also contains an intermediary layer between the stabilization layer and the first lacquer layer which bonds these layers together. At temperatures below 170° C., the adhesive layer is bonded so intimately to the substrate that the interlaminar sandwich cannot be removed from the substrate without tearing it. At temperatures above 150° C., the lacquer layers soften, thereby destroying the diffraction structure. After being built up on a film, the interlaminar sandwich can be punched out in the form of a tag and attached to an identification document thereby protecting the document against attempts to remove the tag.

BRIEF DESCRIPTION OF THE DRAWINGS

Examples of different embodiments of the invention are explained in greater detail below through the drawings in which.

DETAILED DESCRIPTION OF PREFERRED EMBODIMENTS

Figure 1:
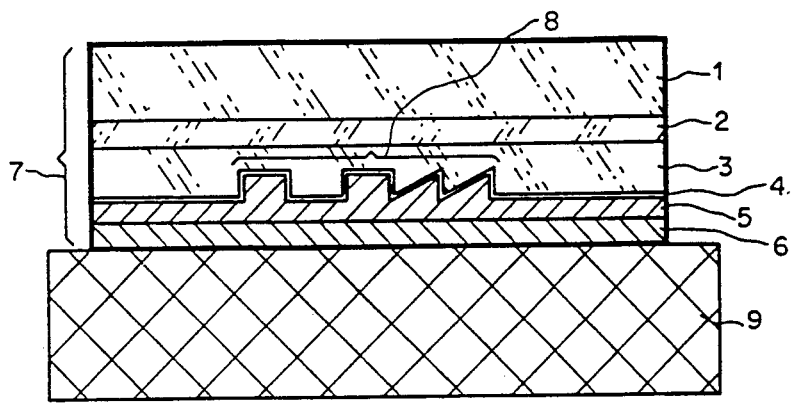
FIG. 1 shows a cross-section through the invention interlaminar sandwich pasted on a substrate.

In FIG. 1, the reference 1 indicates a stabilization layer on which an intermediary layer 2, a first lacquer layer 3, a reflection layer 4, a second lacquer layer 5 and an adhesive layer 6 are arranged in the sequence indicated. The layers 1 to 6 constitute an interlaminar sandwich 7. Between the lacquer layers 3 and 5 optical diffraction structures 8 are embedded, e.g., grating structures, holograms, KINEGRAM ®-devices (KINEGRAM ® is a registered trademark of Landis & Gyr) etc. The adhesive layer 6 attaches the interlaminar sandwich 7 to a substrate 9.

The diffraction structures 8 are illuminated through the stabilization layer 1, the intermediary layer 2 and the lacquer layer 3. The diffracted and reflected light is thrown black through the layers 1 to 3 to the observer.

The stabilization layer 1 is advantageously made of a heat-resistant, clear film of high optical quality. A colorless as well as a colored film can be used. Polyester for example which in addition to possessing high optical quality is characterized by high tensile strength is very well suited as the film material. These films are normally sold in rolls of different thicknesses so that the interlaminar sandwich 7 is advantageously built up by means of a rewinding device which is not shown here, one side of the stabilization layer 1 in the manner indicated further below. These films advantageously have a thickness from 9 to 30 micrometers so as to be sufficiently strong on the one hand, yet without bearing too heavily on substrate 9 on the other hand.

A primer is applied in the form of intermediary layer 2 over the entire surface of the stabilization layer 1. The primer creates a high adhesive capacity between the stabilization layer 1 and the following lacquer layer 3. A lacquer based on polyurethane serves advantageously as the primer so that the intermediary layer 2 may be rendered resistant to light, especially ultraviolet light, and to solvents. The intermediary layer 2 is applied to stabilization layer 1 in a thickness in the micrometer range, preferably from 0.8 to 2 micrometers thick. Films which have already been coated with the intermediary layer 2 by the supplier may also be used advantageously as the stabilization layer 1.

The lacquer layer 3 can also be applied directly onto the stabilization layer 1 if the adhesive capacity of the lacquer layer 3 on the film is sufficiently high. The adhesive capacity can advantageously be increased by means of pre-treatment of the stabilization layer 1. e.g., in a corona or plasma discharge. In these cases, an interface region between the lacquer layer 3 and the stabilization layer 1, or a surface layer of the film altered by the pre-treatment assumes the function of the intermediary layer 2.

The first lacquer layer 3 is advantageously applied in at least one operational step and has a layer thickness between 0.5 and 1.0 micrometer, preferably 0.6 micrometer.

The reflection layer 4 is then applied to the lacquer layer which is preferably pre-treated by means of a corona discharge in order to ensure good adhesion of the reflection layer 4 on the lacquer layer 3. The reflection layer 4 is preferably a vapor-deposited metal, preferably aluminum which is inexpensive and reflects visible as well as infrared light well even in thin layers. A thickness of less than 30 nanometers is sufficient for any metallic reflection layer 4; with aluminum, the thickness is already sufficient with approximately 15 nanometer.

A dielectric material with a reflection coefficient diverging as much as possible from the adjoining layers 3 and 5 is also well suited as reflection layer 4 since the diffraction structures 8 are partly transparent and do not completely hide the materials below, e.g., an image. The utilization of dielectrics is known. The reflection layer 4 can, for instance, consist of a homogenous layer made of a dielectric with a high index of refraction, e.g., $Nb_2O_5$, $TiO_2$ or $ZrO_2$, which have a refractive index of $n=2.5$. This layer is preferably from 55 to 65 mn thick.

To achieve certain optical effects, the reflection layer 4 can preferably consist of several layers, e.g., three or five layers. The first, third and, optionally, fifth layers in this case are here preferably made of one of the above-mentioned materials with a high refractive index, while the second and, optionally, the fourth layers are made of a material with a low refractive index, e.g., $SiO_2$, which has a refractive index of approximately 1.5. The layers made of the material with high refractive index are preferably 55 to 65 nm thick, while the layers made of the material with low refractive index are preferably 70 to 80 nm thick.

The relief profile of at least one optical diffraction structure 8 is embossed with a heated matrix by means of one of the above-mentioned embossing processes into the lacquer layer 3. A predetermined number of diffraction structures 8 is preferably embossed simultaneously at a right angle to the running direction of the film band.

It is also possible to emboss the diffraction structures 8 directly into the lacquer layer 3 before a reflection layer 4 has been applied. Embossing through the reflection layer 4 which is made from a dielectric material has however the advantage that the matrix heated for embossing becomes less soiled because the above-mentioned materials used as a dielectric have less tendency to become attached to the matrix than the lacquer used for the lacquer layer 3 or the metal used for the reflection layer 4.

The relief of the diffraction structures 8 typically has a profile height of approximately 0.5 micrometers. An application of the second lacquer layer 5 of approximately 0.15 to 1.5 micrometer thickness (e.g., 1 micrometer) evens out the relief completely. The same thermoplastic materials are preferably used for both lacquer layers 3 and 5, e.g., an acrylic-polymer lacquer.

The acrylic-polymer lacquer is selected such that the mechanical tensions remaining in the lacquer layer 3 by the embossing process destroy the diffraction structures 8 in the lacquer layer 3 when heated to a temperature between 150° to 160° C.

The acrylic-polymer lacquer of lacquer layer 3 can be dyed so that it is transparent at least in a predetermined portion of the light spectrum. The diffraction structures 8 remain readable by machine or visually in a predetermined color. If, for example, the dye only allows infrared light to pass through, the diffraction structures 8 remain hidden to the naked eye and can only be recognized by means of a reading device which is not shown here and which is able to detect the presence of the diffraction structures 8.

The adhesive layer 6 which is applied at the end of the process typically is of a thickness of less than 6 micrometers and makes it possible to paste the interlaminar sandwich 7 onto the substrate 9. The layer thickness of the adhesive layer 6 is advantageously adapted to the nature of the surface of substrate 9. With a smooth substrate 9, such as with photographic papers, a 3 micrometer thickness of the adhesive layer 6 is sufficient, while said adhesive layer 6 is advantageously 6 micrometers thick or thicker with a rough substrate 9. With a paper having a normal surface roughness, the thickness of the adhesive layer is approximately 6 micrometers.

Heat-activated hot adhesives, e.g., based on polymethyl methacrylate, which develop their adhesive power when heated to approximately 110° C. are suitable for the adhesive layer 6. The interlaminar sandwich 7 can be detached from substrate 9 only at a temperature over 170° C. of the hot-adhesive without the occurrence of excessive, destructive tensions in the interlaminar sandwich 7.

In the paste-on operation, the adhesive layer 6 is heated through the stabilization layer 1, whereby said stabilization layer 1 distributes the arriving heat and transmits it evenly to the layers 3 to 6. Temperatures up to 140° C. can be attained in the adhesive layer 6 without damage to the diffraction structures 8. The hot-adhesives of adhesive layer 6 which are adapted to these temperatures are bonded so intimately to the substrate 9 and exert such high adhesive force after cooling that the paper substrate is damaged if a removal attempt is made, for instance. Detaching the interlaminar sandwich 7 at 170° C. is also useless since the embossed diffraction structures 8 in the lacquer layers 3, 5 are irreversibly destroyed by heat at temperatures from 150° to 160° C. in spite of the stabilization layer 1. If the temperatures during the removal attempt are slightly below 170° C., the tension forces destroy the soft layers 3 to 5.

The completed interlaminar sandwich 7 can leave the rewinding device in the form of a roll for example, which has graphic compositions consisting of diffraction structures 8.

Figure 2:
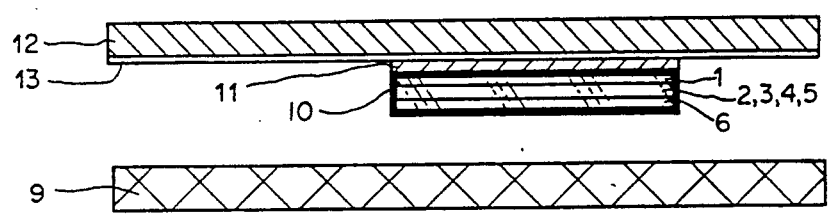
FIG. 2 shows a punch-out interlaminar sandwich in the form of a tag on a support.

A partial surface containing for example a self-contained predetermined composition consisting of diffraction structures 8 is advantageously cut out or punched out from the interlaminar sandwich 7 in the form of a tag 10 (FIG. 2). The tag 10 is placed on the substrate 9. A ram capable of being heated which is not shown here heats the adhesive layer 6 through layers 1 to 5 until said adhesive layer 6 is softened and adheres to the substrate 9. After hardening of the hot-adhesive, the tag 10 is firmly attached to the substrate 9.

The tag 10 can be in the shape of a circle with a diameter of 2 cm and is typically 25 micrometers thick.

The tag 10 may also be cut out in different sizes and may have oval, rectangular or other shapes or other types of borders. Their configuration and dimensions can be predetermined by the graphic composition of the diffraction structures 8 (FIG. 1) for example.

Paper or synthetic materials with different surface characteristics, such as, photographic papers, identification papers, documents, securities, banknotes, etc., are suitable for use as substrate 9.

By comparison with the state of the art, the interlaminar sandwich 7 (FIG. 1) is in addition provided with the stabilization layer 1 and with the intermediary layer 2 which are cut out together with layers 3 to 6 and are transferred to the substrate 9. These two layers 1, 2 have the advantage that in the paste-up process, the occurrence of overheated locations at which the temperature exceeds 150° C. in the layers 3 to 5 and in which thermal destruction of the diffraction structure 8 would occur, are avoided. The stabilization layer 1 is sufficiently heat resistant to mechanically support the layers 3 to 5 which are very sensitive at approximately 140° C. so that the mechanical pressures and weights occurring during paste-up will not destroy the diffraction structures 8. Only the stabilization layer 1 makes it possible to affix tag 10 by means of an advantageously adapted hot-adhesive at a temperature which is very close to but below the destructive temperature of 150° C. to 160° C. of the diffraction structures 8, while detaching it from substrate 9 is only possible at a distinctly higher temperature. Due to the high tensile strength of the stabilization layer 1 and the additional effect of the intermediary layer 2, the tensile forces applied at lower temperature in a removal attempt are transferred into the layers 3 to 6. These tensile forces will destroy the diffraction structures 8 mechanically. A removal attempt with chemical solvents to dissolve the hot-adhesive of the adhesive layer 6 would also be unsuccessful since it would also destroy the lacquer layers 3 and 5.

The stabilization layer 1 advantageously prevents mechanical damage to the diffraction structures 8 during normal use of substrate 9 protected by the tag 10 (FIG. 2).

In an embodiment of the interlaminar sandwich 7 (FIG. 1) the stabilization layer 1 is advantageously provided on the side away from intermediary layer 2 with a cold-adhesive layer 11 (FIG. 2) so that, after being punched out in a predetermined order and orientation, the tags 10 can be affixed through application of pressure to a support 12, e.g., on a silicone-treated paper or on a clear polyester film coated with silicone. This polyester film has the advantage that the tags 10 are visible through the support 12 and can therefore be positioned exactly on substrate 9 before being pasted onto the substrate. The support 12 with the tags 10 which can be wound up on a roll for example, can be transported easily to a paste-up machine which is not shown here. Each tag 10 is heated separately through support 12 to the pasting temperature and is pasted on substrate 9. The cold-adhesive layer 11 does not change in this process, so that the silicone-treated support 12 can be separated easily from tag 10.

The tag 10 can for example be pulled off support 12 and be pasted with the cold-adhesive layer 11 on the hot-adhesive side of a clear lamination film, such as is used for hot-lamination of book covers and identification papers of all kinds. The cold-adhesive layer 11 attaches the tag 10 until the lamination film and the tag 10 are attached simultaneously to substrate 9 under application of heat. Advantageously, stabilization layer 1 prevents thermal destruction of the diffraction structures 8 also during hot-lamination, such as occurs with tags 10 according to the state of the art.

The entire band-shaped interlaminar sandwich 7 (FIG. 1) is advantageously pasted directly with the cold-adhesive layer 11 (FIG. 2) on the band-shaped support 12. A device not shown here punches out tags 10 from the interlaminar sandwich 7, freeing them without damaging the support 12. The portion of the interlaminar sandwich 7 which is not needed and containing no more tags may be pulled off the support, for example. The support 12 on which the tags 10 are affixed may be stored advantageously in the form of a roll until further processing.

The cold-adhesive layer 11 has a thickness in the range of 5 to 30 micrometers. Suitable cold-adhesives are those which are practically colorless at this thickness and do not interfere with the viewing of the diffraction structures 8.

The support 12 is advantageously the clear lamination film itself which is provided with a transparent hot-adhesive layer 13. The tags 10 are pasted on the hot-adhesive layer 13 by means of the cold-adhesive layer 11. Since the tag 10 is visible through the clear lamination film, precise positioning of the tag 10 on substrate 9 is possible immediately preceding paste-up. The clear lamination film and the tag 10 are laminated on the substrate 9 in the customary manner at approximately 120° to 140° C., with the hot-adhesive layer 13 and the adhesive layer 6 being attached to the substrate 9. Following paste-up, the hot-adhesive layer 13 is clear as glass and therefore does not impair the visibility of the diffraction structures 8 (FIG. 1).

The lamination film and the hot-adhesive layer 13 may be dyed and act as colored filters or may also be colorless so as not to interfere with the highly visible interplay of diffracting colors. Due to its high tensile strength and its temperature-resistance, polyester is well suited as the material of the lamination film whose thickness is approximately 80 to 300 micrometers. The hot-adhesive layer 13 has a thickness of 80 to 300 micrometers and can be made of polypropylene, for example.

Figure 3:
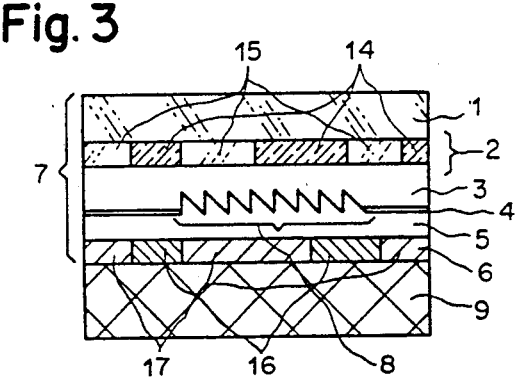
FIG. 3 shows an interlaminar sandwich as in FIG. 1 with nonhomogeneities in an intermediary layer and in an adhesive layer.

In another embodiment of the interlaminar sandwich 7, the primer in the intermediary layer 2 (FIG. 3) is not applied over the entire surface but only in the adhesive zones 14. The adhesive zones 14 form a predetermined pattern on the stabilization layer 1. Interval zones 15 with lower adhesive strength separate the adhesive zones 14 from each other. The intermediary layer 2 has great adhesive strength only in the adhesive zones 14 between the stabilization layer 1 and the following lacquer layer 3.

The interval zones 15 are preferably filled with a separator product in order to achieve good optical contact between the stabilizer layer 1 and the lacquer layer 3. The primer and the separator product prevents adhesion of the stabilization layer 1 on the lacquer layer 3 in the interval zones 15.

If the intermediary layer 2 has locally variable adhesive strength, the detaching force in a removal attempt is transferred only in the adhesive zones 14 to the layers 3 to 6 below. Tensile forces of such magnitude then occur below the adhesive zones 14 in the lacquer layers 3 and 5 so that said lacquer layers 3 and 5 as well as the reflection layer 4 are torn or overstretched locally and either the diffraction structures 8 are destroyed mechanically or are at least altered in a highly visible and irreversible manner as a consequence of local stretching. With a paper substrate 9 it can be assumed that an upper layer is torn out of the surface of substrate 9 below the adhesion zone 14 when a removal attempt is made.

In another embodiment of the interlaminar sandwich 7, the adhesive layer 6 has a locally variable adhesive strength. As soon as the interlaminar sandwich 7 is subjected to tension in an attempt to remove the tag, tensile forces with great local variations occur so that the layers 3 to 5 are mechanically altered or destroyed. The locally changing adhesive strength of the adhesive layer 6 can be achieved through one of the processes described below.

Figure 4A:
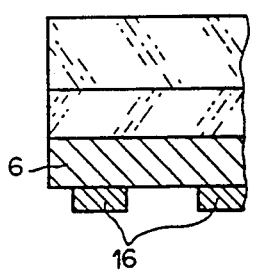
FIG. 4a shows an interlaminar sandwich as in FIG. 1 with separation islands on the adhesive layer before being pasted on, FIG. 4b shows an interlaminar sandwich as in FIG. 4a after being pasted on, FIG. 5 shows an arrangement of the separation islands between a second lacquer layer and the adhesive layer
Figure 4B:
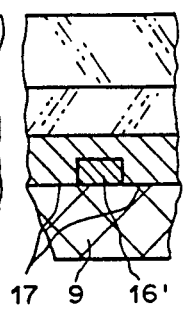

The interlaminar sandwich 7 is provided with a predetermined pattern of separation islands 16 on the adhesive layer 6 (FIG. 4a), whereby the height of the separator product in the separation islands 16, which is applied in one additional operational step, is less than 1 micrometer. During paste-up, the separation islands 16 sink into the hot, soft adhesive layer 6. The sunken separation islands 16' (FIG. 4b) locally prevent the contact of the hot-adhesive with the substrate 9. Partial surfaces between the sunken separation islands 16' constitute adhesion bridges 17 in which the hot-adhesive develops its full adhesive strength.

Figure 5:
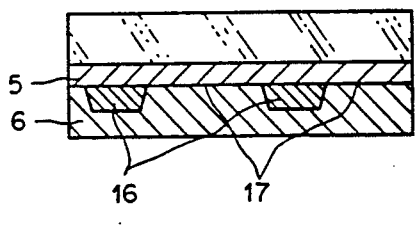

The separator product may also be applied to a thickness of approximately 1 micrometer directly on the second lacquer layer 5 (FIG. 5) in the grid pattern of the separation islands 16. When the adhesive layer 6 is then attached over the entire surface, the separation islands 16 are covered and the adhesion bridges 17 between the separation islands 16 are filled out. Only in the adhesion bridges 17 does the adhesive layer 6 directly adjoin the second lacquer layer 5 and develop its full adhesive strength between layers 5 and 6.

In a third example (FIG. 3) the adhesive layer 6 itself is applied in the predetermined pattern on the second lacquer layer 5. Partial surfaces with a hot-adhesive coating constitute the adhesion bridges 17 which are delimited by the adhesive-free partial surfaces, i.e., the separation islands 16.

Wax-like substances, silicone types, poorly adhering lacquers, etc., are suitable as separator products.

The advantage of this embodiment with locally varying adhesive strength of the intermediary layer 2 or the adhesive layer 6 is an additional protection against malicious removal of the diffraction structures 8 from the protected substrate 9 since the tensile forces occurring during the removal attempt vary unevenly in accordance with the pattern and cause destruction of the diffraction structures 8 at predetermined locations. A combination of the above embodiments is also advantageous if the adhesive strength varies locally in the intermediary layer 2 as well as the adhesive layer 6, since the tearing of the layers 3 to 5 can be precisely predetermined through the local adhesive strength in the two layers 2 and 6.

Figure 6:
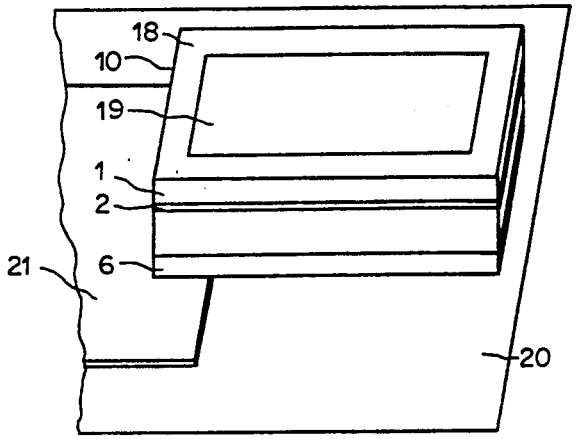
FIG. 6 shows an identification document protected by means of a tag.

For example, the intermediary layer 2 and the adhesive layer 6 can be applied over the entire surface only in a border zone 18 on the tag 10 (FIG. 6) so that the border zone 18 of the stabilization layer 1 is firmly bonded to the substrate 9 and offers no hold to detach the tag 10.

In an area 19 surrounded by the border zone 18, the zones 14 (FIG. 3) and 15 on the one hand, and the separation islands 16 and the adhesion bridges 17 on the other hand, form a predetermined pattern, with the separation islands 16 of adhesive layer 6 being positioned in the regions of the adhesion zones 14 and the adhesion bridges 17 being positioned in the regions of the intermediary zones 15. In a removal attempt the lacquer layers 3 and 5 tear along the borders between the adhesion zones 14 and the intermediary zones 15 because the lacquer layers 3 and 5 adhere more strongly to the stabilization layer 1 than to substrate 9 in the adhesion zones 14, while they are firmly bonded to substrate 9 in the area of the intermediary zones 15 but easily come loose from the stabilization layer 1. The remnants of the interlaminar sandwich 7 are therefore left back on the document in the area of the adhesion bridges 17.

If the pattern of the intermediary layer 2 has adhesion zones 14 in the form of outlines of symbols or of letters which may form a word, the detached tag 10 reveals a highly visible mark which irreversibly indicates a forgery attempt. The negative of the pattern predetermined by the adhesion bridges 17 remains on substrate 9.

The tag 10 (see FIG. 6) is especially well suited to protect a photograph 21, e.g., of the holder, pasted on an identification document 20. Instead of an easily forged imprint of an official stamp or an embossing of an official seal, the tag 10 is placed over adjoining surface portions of the identification document 20 and the photograph 21. One surface portion of the adhesive layer 6 is firmly bonded to the photograph 21, and the other surface portion to the substrate 9 of the identification document 20. This bonding is achieved advantageously by using heat during lamination of the clear lamination film serving as the support 12 and which may cover the entire identification document, for example.

We claim:
1. Interlaminar sandwich, comprising
    first and second lacquer layers,
    a diffraction structure embedded between said first and second lacquer layers,
    a heat activated adhesive layer disposed on said second lacquer layer, and
    a transparent stabilization layer disposed over said first lacquer layer which distributes heat through said interlaminar sandwich to said adhesive layer so that said interlaminar sandwich may be bonded to a substrate.
2. The interlaminar sandwich of claim 1 wherein said stabilization layer is at least 9 micrometers thick.

3. The interlaminar sandwich of claim 2 wherein said stabilization layer is made from a polyester material.

4. The interlaminar sandwich of claim 1 further comprising an intermediary layer between said stabilization layer and said first lacquer layer, said intermediary layer comprising at least one adhesion zone containing a primer which bonds said stabilization layer and said first lacquer layer together.

5. The interlaminar sandwich of claim 4 wherein said primer is made from a polyurethane lacquer.

6. The interlaminar sandwich of claim 4 which is in the form of a tag attachable to a document.

7. The interlaminar sandwich of claim 4 wherein said adhesion zone is co-extensive with said intermediary layer.

8. The interlaminar sandwich of claim 4 wherein said intermediary layer comprises a predetermined pattern of adhesion zones separated by interval zones.

9. The interlaminar sandwich of claim 8 wherein each of said adhesion zones contains a primer and each of said intermediary zones contains a separation product.

10. The interlaminar sandwich of any of claims 1, 4 or 8 wherein said adhesive layer comprises a predetermined pattern of adhesion bridges and separation islands.

11. The interlaminar sandwich of claim 1 in the form of a plurality of tags, each of said tags containing at least one diffraction structure, each of said tags including a cold-adhesive layer disposed on said stabilization layer on a side away from said lacquer layer, said tags being removably attached in a predetermined order and orientation to a support film by means of said cold-adhesive layer.

12. The interlaminar sandwich of claim 11 wherein said support film is a clear polyester film coated with silicone.

13. The interlaminar sandwich of claim 11 wherein said support film is a clear lamination film and includes a hot-adhesive layer attachable to said cold-adhesive layer of said tags.

14. The interlaminar sandwich of claim 1 further comprising a reflection layer disposed on said diffraction structure.

15. The interlaminar sandwich of claim 14 wherein said reflection layer is made from a metal.

16. The interlaminar sandwich of claim 14 wherein said reflection layer is made from a dielectric material.

17. A method for protecting an identification document comprising a photograph affixed to a substrate, said method comprising producing an interlaminar sandwich in accordance with claim 1, forming said interlaminar sandwich into a tag containing at least one diffraction structure, and heating said tag over said identification document so that said adhesive layer overlaps with a portion of said photograph and an adjoining portion of said substrate.

18. A process for producing an interlaminar sandwich having a diffraction structure embedded between first and second lacquer layers comprising embossing a relief profile of at least one optical diffraction structure through a reflection layer made of a dielectric material into said first lacquer layer.

19. An interlaminar sandwich, comprising
first and second lacquer layers,
a diffraction structure embedded between said first and second lacquer layers,
a heat activated adhesive layer disposed on said second lacquer layer, and
a transparent stabilization layer disposed over said first lacquer layer which distributes heat evenly through said interlaminar sandwich so that said interlaminar sandwich may be bonded to said substrate by application of heat to said stabilization layer,
said adhesive layer being layer tightly bonded to said substrate up to a first elevated temperature,
said first and second lacquer layers softening above a second elevated temperature which is less than said first elevated temperature so that said diffraction structure will be destroyed when said interlaminar sandwich is heated above said second elevated temperature.

20. The interlaminar sandwich of claim 19 which is in the form of a tag attachable to a document.

21. The interlaminar sandwich of claim 19 further comprising an intermediary layer between said stabilization layer and said first lacquer layer, said intermediary layer comprising at least one adhesion zone containing a primer which bonds said stabilization layer and said first lacquer layer together.

22. The interlaminar sandwich of claim 21 wherein said intermediary layer comprises a predetermined pattern of adhesion zones separated by interval zones.

23. The interlaminar sandwich of any of claims 19 to 22 wherein said adhesive layer comprise a predetermined pattern of adhesion bridges and separation islands.

* * * * *